UNITED STATES PATENT OFFICE.

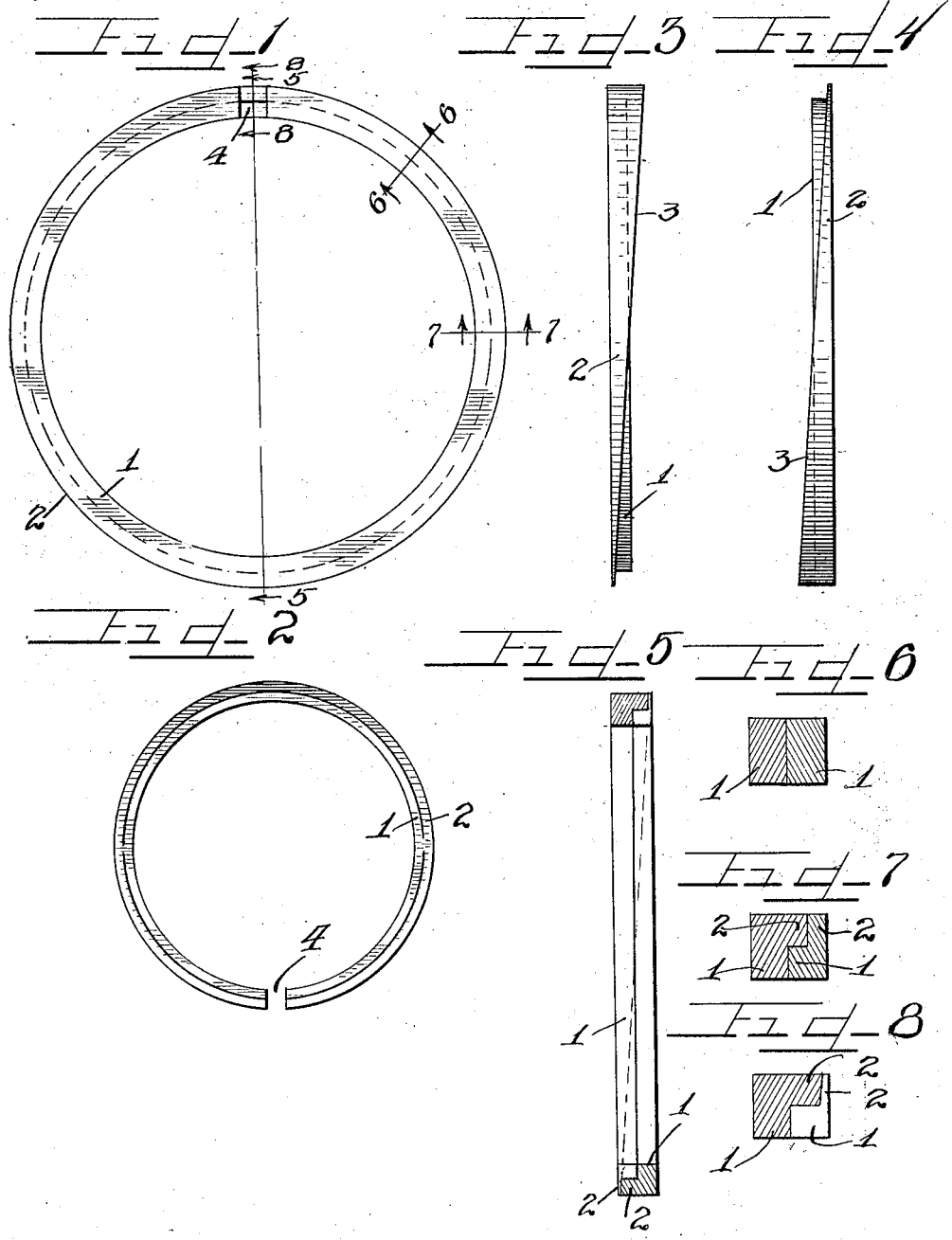

CLARANCE ROSS BRYANT, OF CHICAGO, ILLINOIS, ASSIGNOR TO D. B. BYRNS, OF CHICAGO, ILLINOIS.

PISTON-RING.

1,262,632.

Specification of Letters Patent. Patented Apr. 16, 1918.

Application filed October 18, 1916. Serial No. 126,243.

*To all whom it may concern:*

Be it known that I, CLARANCE ROSS BRYANT, a citizen of the United States, and a resident of the city of Chicago, in the county of Cook and State of Illinois, have invented certain new and useful Improvements in Piston-Rings; and I do hereby declare that the following is a full, clear, and exact description of the same, reference being had to the accompanying drawings, and to the numerals of reference marked thereon, which form a part of this specification.

This invention relates to an improved type of compression-tight piston ring adapted for use where a leak proof packing is desired.

It is an object therefore of this invention to construct a compression-tight piston ring consisting of two similarly constructed elements, the inner and outer wall of each of which are truly circular, and complemental to interfit with one another, but with certain portions of said elements of varying thickness so that the same interfit with one another to form a ring of uniform thickness with the opening or gaps in the respective sections however offset from one another.

It is also an object of this invention to construct a piston ring comprising two sections interfitting with one another, the inner and outer peripheries of each of which are truly circular, and with said rings each having a flange portion varying in thickness so that when assembled with one another, a piston ring of uniform thickness is obtained.

It is furthermore an object of this invention to construct a compression-tight piston ring comprising split ring sections, each having a circular portion of uniform thickness, and a circular flange of varying thickness integral therewith whereby said rings may complementally interfit with one another, and with the openings thereof disposed substantially diametrically opposite to one another in the assembled ring so that leakage past the ring in use is prevented.

It is finally an object of this invention to construct a simple type of compression-tight piston or packing ring consisting of sections of varying thickness complementally interfitting with one another, and each having an inner and outer truly circular periphery affording, when assembled, a circular ring of uniform thickness throughout.

The invention (in a preferred form) is illustrated in the drawings and hereinafter more fully described.

On the drawings:

Figure 1 is an elevational view of a piston ring embodying the principles of my invention.

Fig. 2 is an elevation of one of the ring sections.

Fig. 3 is a side view of one of the ring sections.

Fig. 4 is a side view of the other ring section.

Fig. 5 is a detail section taken on line 5—5 of Fig. 1.

Fig. 6 is a detail section taken on line 6—6 of Fig. 1.

Fig. 7 is a detail section taken on line 7—7 of Fig. 1.

Fig. 8 is a detail section taken on line 8—8 of Fig. 1.

As shown on the drawings:

The ring sections of the piston ring are identical in form but as used one is reversed so that one is a right handed member and the other is a left handed member, so that the same may complementally interfit with one another. Each ring section is provided with a circular portion 1, of uniform thickness, and formed around the outer periphery thereof is a flange portion 2, one end surface of which is flat and flush with one end surface of the ring portion 1, and the other end surface of which is inclined, as denoted by the reference numeral 3, so that said flanged portion 2, is of continuously varying thickness throughout. Each of said piston rings is split so that a gap 4, is provided therein at the point of minimum thickness of the flanged portion.

When the respective ring sections, which are identically constructed, are assembled with one another, the portion of maximum thickness of one ring section is disposed around the ring portion 1, of the other section, contacting with the inclined surface of the portion of minimum thickness of the portion 2, of said other ring section in the manner shown in the sectional detail in Fig. 8, and as a consequence, the gaps 4, in said respective ring sections are disposed substantially diametrically opposite from one another. Said gaps 4, always maintain this relation to one another to prevent leakage past the ring when it is in use owing to the fact that a relative rotation of the respective ring sections would necessarily take place in order to bring said gaps into register. This is prevented owing to the varying thickness of the contacting shoulders or flanged portions 2, of said respective ring sections, which, bearing against one another, would serve to separate the ring sections, if relative movement were caused to take place therebetween, and such separation is prevented due to the engagement of the ring in the groove provided therefor in the piston on which the ring is used.

I am aware that the details of construction may be varied through a wide range without departing from the principles of this invention, and I therefore do not purpose limiting the patent granted otherwise than necessitated by the prior art.

I claim as my invention:

A piston ring, comprising ring sections of similar construction, each having a gap therein disposed diametrically opposite each other in the assembled piston ring, and each section being formed with a circular portion of even thickness and a flanged portion of varying thickness, one surface of each of said respective flanged portions being in a plane oblique to the plane of the assembled piston ring, and with said circular and oblique surfaces of said ring sections in contact with one another respectively.

In testimony whereof I have hereunto subscribed my name in the presence of two subscribing witnesses.

CLARENCE ROSS BRYANT.

Witnesses:
RUSSELL SMITH,
C. KALISKE.